United States Patent
Ritter et al.

(10) Patent No.: US 9,765,690 B2
(45) Date of Patent: Sep. 19, 2017

(54) VARIABLE GEOMETRY TURBOCHARGER PROGNOSTICS

(71) Applicant: Deere & Company, Moline, IL (US)

(72) Inventors: Curtis P. Ritter, Waterloo, IA (US); Brigham R. Shamrell, Cedar Falls, IA (US); Michael J. Ryken, Cedar Falls, IA (US); Stephane Cochet, Saint Jean de Braye (FR); Jeffrey M. Hedberg, Bothell, WA (US); Zachary M. Sharp, Moline, IL (US); Joseph A. Bell, Fairbank, IA (US); Mark A. Friedrich, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 169 days.

(21) Appl. No.: 14/870,696

(22) Filed: Sep. 30, 2015

(65) Prior Publication Data

US 2017/0089258 A1    Mar. 30, 2017

(51) Int. Cl.
*F02B 77/08* (2006.01)
*G07C 5/08* (2006.01)
(Continued)

(52) U.S. Cl.
CPC ............ *F02B 77/083* (2013.01); *F02B 37/22* (2013.01); *F02B 37/24* (2013.01); *F02B 39/16* (2013.01);
(Continued)

(58) Field of Classification Search
CPC .......... F02B 77/083; F02B 37/24; F02C 6/12; F02D 41/0002; F02D 41/0007;
(Continued)

(56) References Cited

U.S. PATENT DOCUMENTS

| 4,215,412 A | 7/1980 | Bernier et al. |
| 5,249,459 A | 10/1993 | Becker |

(Continued)

OTHER PUBLICATIONS

EP16190366.1 Extended European Search Report dated Apr. 11, 2017 (9 pages).

(Continued)

*Primary Examiner* — Thomas G Black
*Assistant Examiner* — Sara Lewandroski
(74) *Attorney, Agent, or Firm* — Michael Best & Friedrich LLP

(57) ABSTRACT

Systems and methods are provided for a diagnostic system for a machine with a combustion engine and a variable geometry turbocharger that includes a vane position sensor. The diagnostic system includes a controller configured to calculate a learned span value of the turbocharger based on the output of the vane position sensor during a diagnostic procedure and a reference vane position sensor value. A plurality of learned span values are calculated each during a different one of a plurality of diagnostic procedures performed over a period of time and a first regression analysis to predict an expected learned span value at a defined future time using the calculated learned span value and the plurality of stored learned span values. An alert message is generated when the expected learned span value is indicative of a potential future fault of the turbocharger.

21 Claims, 11 Drawing Sheets

(51) Int. Cl.
*F02D 41/22* (2006.01)
*F02D 41/24* (2006.01)
*F02B 37/22* (2006.01)
*F02B 37/24* (2006.01)
*F02B 39/16* (2006.01)
*F04D 27/00* (2006.01)
*F04D 27/02* (2006.01)
*F02D 41/00* (2006.01)
*F02C 6/12* (2006.01)
*F02D 41/14* (2006.01)

(52) U.S. Cl.
CPC ....... *F02D 41/0007* (2013.01); *F02D 41/221* (2013.01); *F02D 41/2496* (2013.01); *F04D 27/001* (2013.01); *F04D 27/0246* (2013.01); *G07C 5/0808* (2013.01); *F02C 6/12* (2013.01); *F02D 2041/1412* (2013.01); *F05D 2260/80* (2013.01); *F05D 2260/821* (2013.01)

(58) Field of Classification Search
CPC ........ F02D 41/22; F02D 41/221; F02D 41/26; F02D 2041/001; F02D 2041/224; F02D 2041/1412; F04D 27/001; F04D 27/0246; F05D 2260/80; F05D 2260/82; F05D 2260/821; G07C 5/0808
See application file for complete search history.

(56) References Cited

U.S. PATENT DOCUMENTS

| | | | | |
|---|---|---|---|---|
| 6,456,928 | B1* | 9/2002 | Johnson | F02B 77/08 701/111 |
| 6,457,461 | B1* | 10/2002 | Romzek | F02D 41/0007 123/568.16 |
| 7,089,154 | B2* | 8/2006 | Rasmussen | G01M 13/045 702/183 |
| 2003/0149522 | A1* | 8/2003 | Arnold | F01D 17/14 701/100 |
| 2005/0187680 | A1 | 8/2005 | Kamdar et al. | |
| 2006/0257237 | A1* | 11/2006 | McDonald | F01D 17/16 415/1 |
| 2007/0214787 | A1* | 9/2007 | Noelle | F02B 37/24 60/602 |
| 2008/0295513 | A1* | 12/2008 | Rollinger | F02B 37/24 60/602 |
| 2009/0024295 | A1* | 1/2009 | Swenson | G01F 9/02 701/100 |
| 2009/0048802 | A1* | 2/2009 | Wang | F02B 37/24 702/138 |
| 2010/0023369 | A1* | 1/2010 | Chapman | G06Q 10/04 701/101 |
| 2012/0137678 | A1* | 6/2012 | Brahma | F02B 37/12 60/605.1 |
| 2015/0275753 | A1* | 10/2015 | Pfister | F02D 41/22 702/35 |
| 2015/0369236 | A1* | 12/2015 | Campagna | F04B 51/00 702/34 |
| 2015/0371454 | A1* | 12/2015 | Hodel | G07C 3/00 702/34 |
| 2015/0371464 | A1* | 12/2015 | Fujimori | G07C 5/0841 701/29.1 |
| 2016/0084155 | A1* | 3/2016 | Rampone | F01D 17/24 123/568.11 |
| 2016/0123238 | A1* | 5/2016 | Kay | F02C 9/20 415/1 |
| 2016/0178470 | A1* | 6/2016 | Ge | G01M 15/106 73/1.57 |
| 2016/0305273 | A1* | 10/2016 | Ratke | F02D 41/0007 |

OTHER PUBLICATIONS

Ferraz et al., "Turbo Machinery Failure Prognostics," chapter in book, Modern Advances in Applied Intelligence (2014) pp. 349-358, vol. 8481.

* cited by examiner

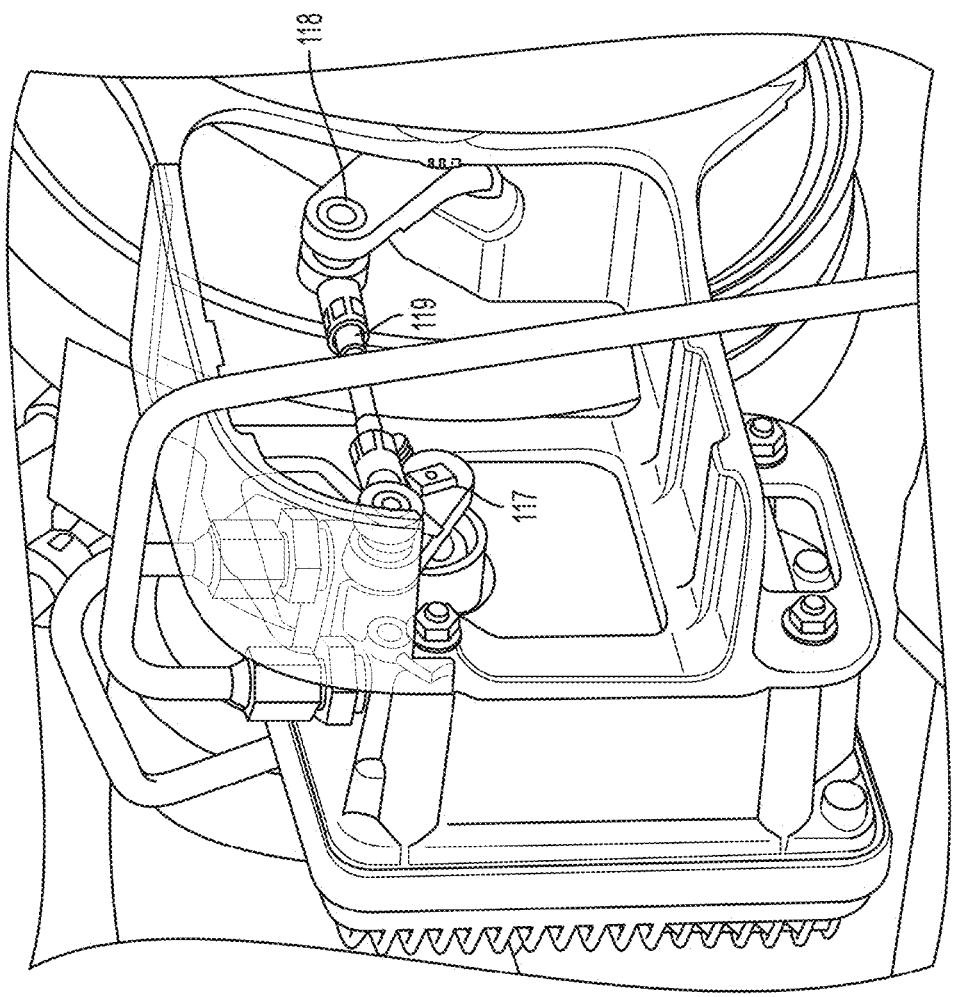

VARIABLE GEOMETRY TURBOCHARGER PROGNOSTICS

BACKGROUND

The present invention relates to methods and systems used to monitor and diagnose conditions of a variable geometry turbocharger.

SUMMARY

Modern internal combustion engine turbochargers are complicated, expensive components. Turbocharger failures can cause extensive 'downtime' for a customer using the machine since failure typically occurs without the customer knowing the failure is impending, and parts may not necessarily be available locally. Turbocharger failures can also cause extensive engine damage if components are ingested into the engine. The cost of repair could be significantly decreased if a prediction was made regarding the potential failure of the turbocharger.

In one embodiment, the invention provides a diagnostic system for a machine with a combustion engine and a variable geometry turbocharger. The variable geometry turbocharger includes a vane position sensor. The diagnostic system includes a controller configured to monitor an output from the vane position sensor indicative of a position of a vane of the turbocharger during a diagnostic procedure, and calculate a learned span value of the turbocharger based on the output of the vane position sensor during the diagnostic procedure and a reference vane position sensor value. The controller is also configured to access a plurality of stored learned span values. Each learned span value is calculated during a different one of a plurality of diagnostic procedures performed over a period of time. The controller is further configured to perform a first regression analysis to predict an expected learned span value at a defined future time using the calculated learned span value and the plurality of stored learned span values, and generate an alert message when the expected learned span value is indicative of a potential future fault of the turbocharger.

In another embodiment the invention provides a method of diagnosing a machine with a combustion engine, and a variable geometry turbocharger. The variable geometry turbocharger includes a vane position sensor. The method includes monitoring an output from the vane position sensor indicative of a position of a vane of the turbocharger during a diagnostic procedure, and calculating a learned span value of the turbocharger based on the output of the vane position sensor during the diagnostic procedure and a reference vane position sensor value. The method also includes accessing a plurality of stored learned span values. Each learned span value is calculated at a different one of a plurality of diagnostic procedures performed over a period of time. The method further includes performing a first regression analysis to predict an expected learned span value at a defined future time using the calculated learned span value and the plurality of stored learned span values, and generating an alert message when the expected learned span value is indicative of a potential future fault of the turbocharger.

Other aspects of the invention will become apparent by consideration of the detailed description and accompanying drawings.

BRIEF DESCRIPTION OF THE DRAWINGS

FIG. 2B is a perspective drawing of a turbocharger assembly as included in the system shown in FIG. 1.

DETAILED DESCRIPTION

Figure 1:
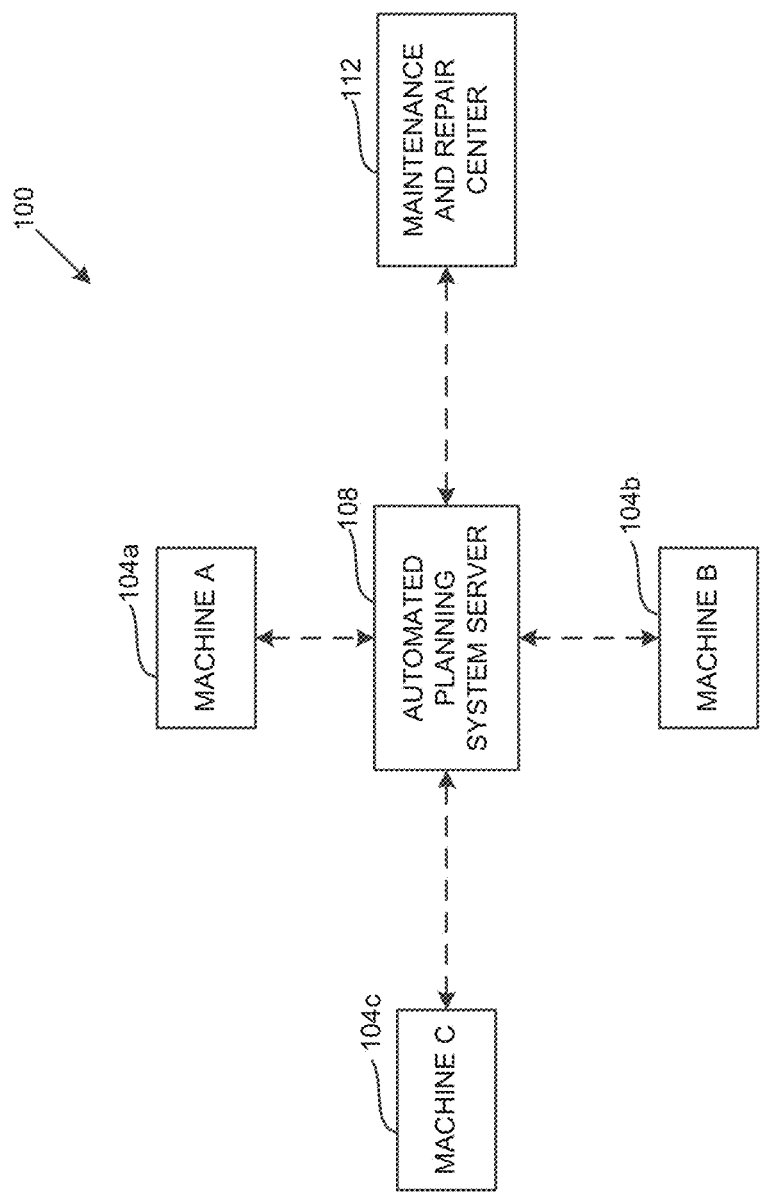
FIG. 1 is a schematic diagram of a service and maintenance system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor," "central processing unit," and "CPU" are interchangeable unless otherwise stated. Where the terms "processor," or "central processing unit," or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a diagnostics system 100. The diagnostics system 100 includes a plurality of machines 104a-c, an automated planning system server 108, and a service and repair center 112. The machine diagnostics system 100 monitors information obtained from various sources regarding each of the machines 104. For example, the machine diagnostics system 100 may obtain information directly from the machines 104, from a manufacturer associated with the machines 104, and/or from the service center computer system 112. The machine diagnostics system 100 uses the gathered information about the machines 104 to optimize the operation, maintenance, and repair of the machines 104. For example, the machine diagnostics system 100 allows the automated planning system server 108 to monitor information about the machines 104 and alert the service and repair center 112 when a service issue associated with one of the machines 104 is detected by the automated planning system server 108. The service and repair center 112 may then proactively perform preventative maintenance on the machine 104 before the machine 104 encounters a more serious service issue.

Figure 2A:
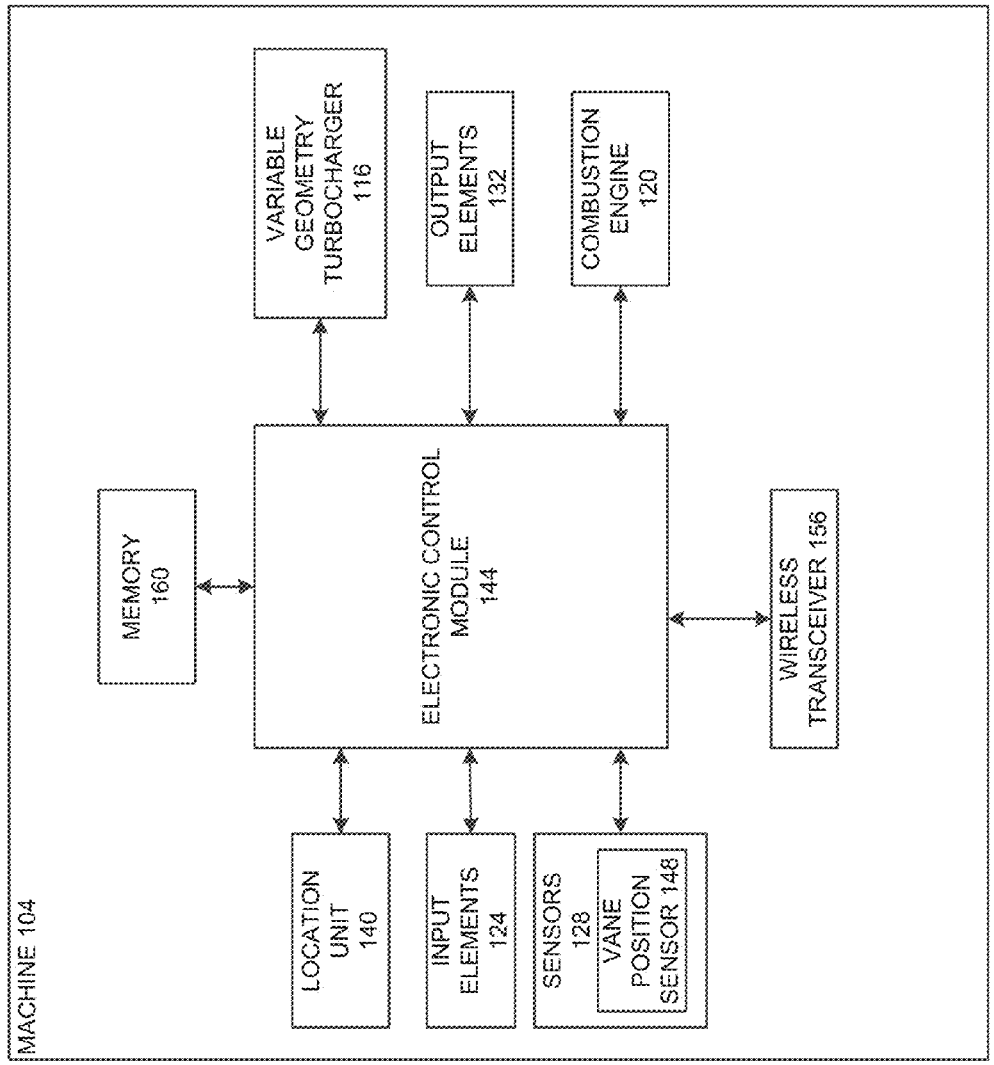
FIG. 2A is a schematic diagram of a control system for a machine monitored by the system of FIG. 1.

The machines 104a-c can be different types of machines each being configured to perform a specific task (e.g., digging, harvesting, mowing, spraying, etc.). For example, the machines 104a-c may include vehicle or set of vehicles such as shovels, tractors, box drills, planters, harvesters, scrapers, sprayers, cutters, shredders, bailers, etc. As shown in FIG. 2A, each machine 104 includes a variable geometry turbocharger 116, a combustion engine 120, input elements 124 for controlling the combustion engine 120, sensors 128 for monitoring parameters of the combustion engine and the variable geometry turbocharger 116, output elements 132 for informing and/or instructing the user, a location unit 140, an electronic control module 144, and a wireless transceiver 156.

As shown in FIG. 2A, the components of the machine 104 communicate with the electronic control module 144. The electronic control module 144 manages and controls the interactions between the components of the machine 104. The input elements 124 determine the operation of the combustion engine 120. The input elements 124 allow the user to interact with the machine 104 and control various aspects of the machine 104. For example, through various user inputs, a particular machine 104 controls the combustion engine 120 such that the machine travels at a specific speed or generates a specific amount of torque.

The turbocharger 116 enhances the operation of the combustion engine 120. The turbocharger 116 includes a first turbine wheel that receives exhaust gas from the combustion engine 120. The exhaust gas spins the first turbine wheel, which in turn spins a compressor wheel. The compressor wheel receives dense ambient air, which is then fed into a combustion chamber of the combustion engine 120. Positioned around the first turbine wheel and adjacent the first turbine wheel, vanes of the turbocharger 116 allow for a more controlled operation of the turbocharger 116. As shown in FIG. 2B, in some embodiments, the turbocharger 116 includes an actuator 117 that is connected to a vane actuator arm 118. A linkage arm 119 joins the actuator 117 and the vane actuator arm 118. The actuator arms 117, 118, and the linkage arm 119 rotate together to move the vanes between open and closed positions, such that the amount of air introduced into the combustion chamber can be precisely regulated. The turbocharger 116 can then improve fuel efficiency of the combustion engine 120.

The machine 104 also includes various sensors 128 configured to detect and measure various parameters of the machine 104. The specific measurements and/or data collected by the sensors 128 are specific to each type of machine 104 and each use of the machine 104. The sensors 128 communicate periodically with the electronic control module 144 to transmit the measured quantity to the electronic control module 144. The electronic control module 144 may store the output received from the sensors 128 and/or perform analysis based on the output from the sensor 124 to gain a better understanding of how the machine 104 operates.

In the illustrated embodiment (see FIG. 2A), the machine 104 includes a vane position sensor 148. The vane position sensor 148 can be an absolute position sensor and/or a relative position sensor. In some embodiments, the vane position sensor 148 is an absolute position sensor (e.g., a Hall Effect sensor). An absolute position sensor can be incorporated into the turbocharger 116 shown in FIG. 2B, or it can be used in other turbocharger systems such as, for example, an electro/hydraulic variable turbocharger. In such embodiments, the vane position sensor 148 communicates the position to the electronic control module 144.

In the illustrated embodiment (FIGS. 2A-B), however, the vane position sensor 148 is a relative position sensor in the form of a rotary encoder. In the illustrated embodiments, the vane position sensor 148 is included within the turbocharger actuator for driving the vanes. The relative position of the vane is measured in encoder counts by the rotary encoder. Accordingly, in the illustrated embodiment, the vane position sensor 148 provides a number of rotations executed by the actuator 117, but does not provide a specific position within the rotations.

The output from the vane position sensor 148, however, may change over time due to several aspects such as, part variation, wear, etc. Therefore, monitoring the output from the vane position sensor 148 provides a way to monitor the state of the turbocharger 116. To monitor the output from the vane position sensor 148, a calibration is performed at an initial power-on of the turbocharger 116. The calibration includes exercising an entire range of vane positions from a low stop to a high stop. Values for the calibration are stored in a non-transitory computer-readable memory 160 of the machine 104. The values obtained from this calibration are used to monitor and analyze subsequent values obtained from the vane position sensor 148. The values from the original calibration are referred to as reference vane position sensor values. For each subsequent power-on, a diagnostic procedure is followed in which the motor drives the actuator 117, 118 from the low stop (e.g., the beginning of rotation) to the high stop (e.g., the end of rotation). The values obtained from the vane position sensor 148 during the diagnostic procedure are compared to the reference vane position sensor values. For each of the subsequent diagnostic procedures, a "learned span" value is calculated. The "learned span" is a quantity that refers to ratio of the current vane position sensor value and the reference vane position sensor value. The electronic control module 144 monitors the learned span of the turbocharger 116 of the machine 104 to determine whether a potential future fault is associated with the turbocharger 116, since large or abrupt variations in learned span over time are indicative of a fault of the turbocharger 116.

The location unit 140 communicates with the electronic control module 144 to indicate the geographical position of the machine 104. In some embodiments, the location unit 140 includes a GPS unit that communicates with an external satellite to determine the location of the machine 104. In other embodiments, the location unit 140 can include other types of position sensors.

The electronic control module 144 is also coupled to various output elements 132. These output elements 132 further increase user interaction and increase the amount of information that is readily available to the user of the machine. The output elements 132 can also vary by machine 104 and may include, among other things, light indicators, speakers, a screen to display textual messages, and the like.

The wireless transceiver 156 is configured to communicate with a remote device information from the electronic control module 144. In the illustrated embodiment, the wireless transceiver 156 communicates with the automated planning system server 108 regarding various aspects of the machine 104. In particular, the wireless transceiver 156 communicates sensor data and position data from the machine 104 to the automated planning system server 108. For example, the wireless transceiver 156 communicates the position values for the vanes of the turbocharger 116 and/or the learned span values for the diagnostic procedures of the turbocharger 116. In some embodiments, the wireless transceiver 156 and the location unit 140 are part of a vehicle telematics system. In such embodiments, the wireless transceiver 156 and the location unit 140 may be housed separately than the rest of the components of the machine 104.

The electronic control module 144 receives sensor outputs from the sensors 128, receives user inputs through the input elements 124, outputs control signals to the combustion engine 120, the turbocharger 116, and the output elements 132, and exchanges data with an external device via the wireless transceiver 156. In the illustrated embodiment, the electronic control module 144 is configured to receive a signal from the vane position sensor 148. Based on the output signal from the vane position sensor 148, the electronic control module 144 determines whether to change the position of the vanes. Additionally, the electronic control module 144 is configured to calibrate the turbocharger vane position sensor 148 periodically. In the illustrated embodiment, the vane position sensor 148 is calibrated each time the engine is activated (e.g., powered on).

As discussed above, during the diagnostic procedure of the turbocharger 116, the electronic control module 144 receives an output from the vane position sensor 148 indicative of the encoder counts corresponding to vane position. The electronic control module 144 then calculates a learned span value by calculating the ratio of the present vane position sensor value to the reference vane position sensor value. The electronic module 144 stores the learned span values in the memory 160. In some embodiments, the electronic control module 144 automatically erases the learned span values after a predetermined amount of time has passed. The electronic module 144 communicates, through the wireless transceiver 156, a plurality of the learned span values to the automated planning system server 108 to allow the automated planning system server 108 to analyze the operation of the turbocharger 116 and predict whether the turbocharger 116 will experience a fault or failure in a predefined time in the future. In some embodiments, the learned span values are communicated soon after the diagnostic procedure of the turbocharger 116 to the wireless transceiver 156 such that learned span values are communicated to the automated planning system server 108 as they are calculated.

The electronic control module 144 can also analyze other sensor data and determine whether the operation of the machine 104 is abnormal. For example, the electronic control module 144 can analyze various sensor data and determine whether the machine 104 is associated with any active fault codes. If the machine 104 includes any active fault codes, the electronic control module 144 transmits the active fault codes to the automated planning system server 108 and/or to the service and repair center 112 through the wireless transceiver 156. The communication of the active fault codes indicates to the automated planning system server 108 and to the service and repair center 112 a particular service issue of the machine 104.

Figure 3:
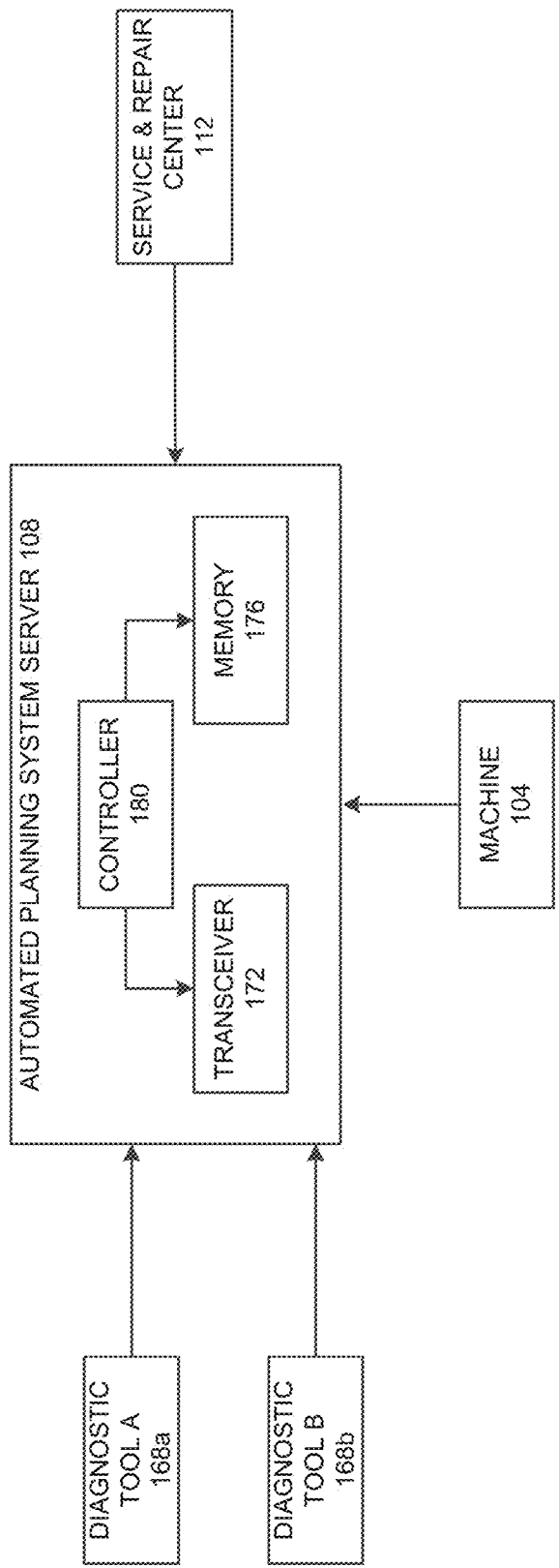
FIG. 3 is a schematic diagram for a computer-based machine diagnostics system of FIG. 1.

As shown in FIG. 3, the automated planning system server 108 communicates with a plurality of diagnostic tools 166a-b. The diagnostic tools 168 are portable electronic devices that can be easily carried from one location to the next. The diagnostic tools 168 also provide a graphical user interface for the user (e.g., a technician and/or engineer performing the service on the machine 104) to view instructions, and other information related to the service issue associated with the machine 104. The diagnostic tools 168 also include a communication unit configured to enable communication between the automated planning system server 108 and the portable diagnostic tool 168. The portable diagnostic tool 168 may also include other components such as, for example, a speaker, a microprocessor, a removable and/or rechargeable power source, communication ports to communicate with other external device, and the like.

As also shown in FIG. 3, the automated planning system server 108 includes a communication transceiver 172, a non-transitory computer-readable memory 176, and a controller 180. The transceiver 172 enables the automated planning system server 108 to communicate with various components of the diagnostics system 100, such as the machine 104, the diagnostic tools 168, and the service and repair center 112 (i.e., a computer system of the service and repair center 112). The transceiver 172 receives information from the machine 104 through the wireless transceiver 156. The wireless transceiver 156 of the machine 104 communicates various types of information to the transceiver 172. In particular, the wireless transceiver 156 of the machine 104 communicates a plurality of learned span values to the transceiver 172 to allow the automated planning system server 108 to analyze the learned span values and alert of impending failure of the turbocharger 116. The wireless transceiver 156 of the machine 104 also communicates other sensor data, location data, and other information to the transceiver 172 for further analysis.

Once the automated planning system server 108 receives the sensor data, and other information from the machine 104, the automated planning system server 108 stores the received information in the non-transient computer-readable memory 176. The memory 176 stores information for a plurality of different machines, such that information can be provided to the user regardless of the nature of the machine 104. In the illustrated embodiment, the memory 176 stores data from the vane position sensor 148.

The controller 180 of the automated planning system server 108 analyzes the vane position sensor data to determine whether the turbocharger 116 is experiencing a failure and/or if the turbocharger 116 may experience a failure at a predefined future time. In particular, the controller 180 accesses the vane position sensor data from the memory 176 and performs two regression analyses of the vane position sensor data. Based on the regression analyses, the controller 180 determines a condition of the machine 104 (e.g., whether the turbocharger 116 is vulnerable) and whether the turbocharger may experience a future fault. In some embodiments, the automated planning system server 108 communicates with the service and repair system 112 regarding the determined condition of the machine 104 to expedite repair and/or maintenance of the machine 104.

Figure 4:
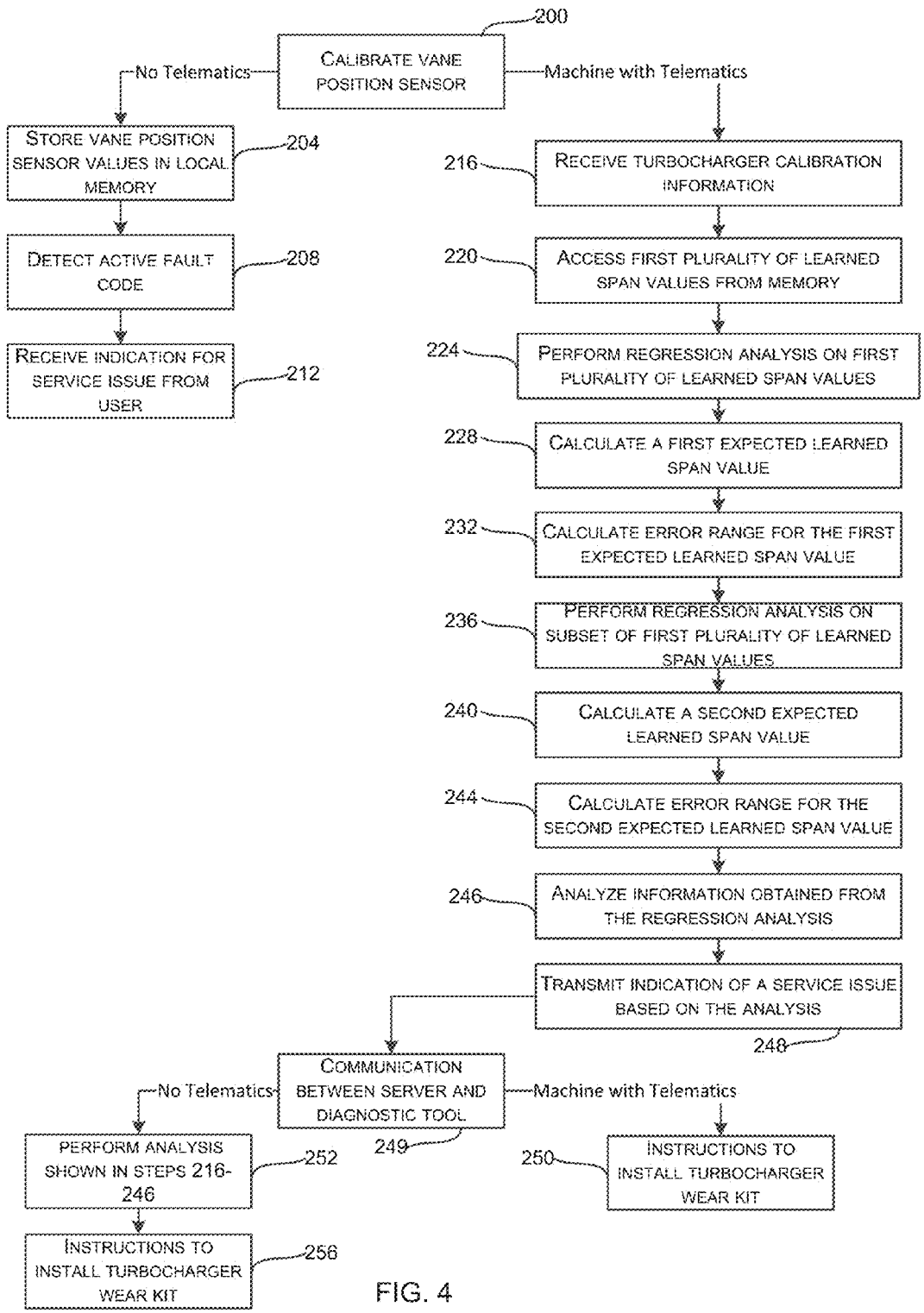
FIG. 4 is a flowchart of a general operation of the invention.

FIG. 4 illustrates a flowchart illustrating a method of determining a condition of the machine 104. First in step 200, the vane position sensor 148 is calibrated at the machine 104. Based on whether the machine 104 includes a machine telematics system (e.g., whether the wireless transceiver 156 of the machine 104 transmits machine information to the automated planning system server 108), the information related to the turbocharger 116 is communicated to the automated planning system server 108 through the wireless transceiver 156 or through a connector to a diagnostic tool 168. FIG. 4 is separated into two columns to show the workflow with and without wireless transceivers 156. If the machine 104 is not equipped with the wireless transceiver 156, the vane position sensor values are stored at the memory 160 of the machine 104 (step 204). In some embodiments the learned span values are also saved in the memory 160. In the illustrated embodiment, the electronic control module 144 performs some analyses on the sensor data of the machine 104 and detects an active fault code based on the sensor data (step 208). The automated planning system server 108 then receives an indication of a service issue of the machine 104 from a user (step 212).

On the other hand, if the machine 104 is equipped with the wireless transceiver 156, the electronic control module 144 transmits the diagnostic procedure information to the automated planning system server 108 periodically (step 216). In some embodiments, the electronic control module 144 forwards outputs from the vane position sensor 148 as they are collected during the diagnostic procedures (e.g., after every diagnostic procedure). If the electronic control module 144 transmits the outputs from the vane position sensor 148, the automated planning system server 108 also obtains access to the reference position sensor values. In other embodiments, the electronic control module 144 forwards the calculated learned span values from the diagnostic procedure, instead of the actual outputs from the vane position sensor 148.

Once the automated planning system server 108 receives the values related to the diagnostic procedure of the vane position sensor 148, the controller 180 of the automated planning system server 108 analyzes the diagnostic procedure data (i.e., the learned span values) to predict if a turbocharger failure will occur by the predefined future time. In particular, the controller 180 accesses a plurality of learned span values from memory 176 (step 220). In the illustrated embodiment, the controller 180 accesses the previous ten learned span values. The controller 180 performs a regression analysis on the plurality of learned span values to predict what the learned span value will be at a predefined future time (step 224). The controller 180 then calculates a first expected learned span value for a predefined future time (e.g., 50 hours after the last diagnostic procedure) based on the regression analysis performed (step 228). In the illustrated embodiment, the controller 180 also calculates an error range for the expected learned span value (step 232). In the illustrated embodiment, the controller 180 calculates the $90^{th}$ percent of the expected learned span value (e.g., a low 10-point estimate) and the $110^{th}$ percent of the expected learned span value to determine the error range (e.g., a high 10-point estimate).

The controller 180 also performs a second regression analysis on a subset of the plurality of learned span values of the first plurality (step 236). In the illustrated embodiment, the controller 180 performs the second regression analysis on half (e.g., five) of the learned span values used in the first regression analysis. The controller 180 then calculates a second expected learned span value for the predefined future time (step 240). As was done with the first expected value, an error range is calculated for the second expected learned span value (step 244). In the illustrated embodiment, the controller 180 calculates the $90^{th}$ percent of the second expected learned span value (e.g., a low 5-point estimate) and the $110^{th}$ percent of the expected learned span value to determine the error range (e.g., a high 5-point estimate).

Performing both regression analyses, provides information regarding the long term operation and vulnerability (from the first plurality of learned span values) of the turbocharger 116 as well as the short-term operation of the turbocharger 116 (from the subset of the first plurality of learned span values). Using the first expected learned span value, the second expected learned span value, as well as some of the information obtained from the first regression analysis and the second regression analysis, the controller 180 analyzes the regression analysis information to determine a condition of the machine 104 and to determine whether the turbocharger 116 is associated with a potential future fault (step 246). For example, the controller 180 can determine whether the turbocharger 116 needs to be replaced, a turbocharger wear kit needs to be installed, or whether a different component of the machine 104 needs replacement. The turbocharger wear kit includes parts and instructions for service that helps extend the life of the turbocharger. Based on the machine condition determined by the controller 180, the automated planning system server 108 sends an indication of a service issue to the service and repair center 112 (step 248).

Once the service and repair center 112 receives the service issue indication (steps 212 or 248), a diagnostic tool 168 communicates with the automated planning system server 108 to obtain more information about the service issue (step 249). When the machine 104 includes the wireless transceiver 156, the automated planning system server 108 provides detailed instructions on how to address the condition determined by the controller 180 (step 250). In the illustrated embodiment, the instructions identify that the turbocharger wear kit is to be installed. However, when the machine 104 does not include the wireless transceiver 156, the automated planning system server 108 provides instructions for the diagnostic tool 168 to obtain the vane position sensor data and/or the stored learned values and analyze the learned span values according to steps 216-246 (step 252). The diagnostic tool 168 can provide the components necessary to perform the analysis of the vane position sensor, or the diagnostic tool 168 can forward the sensor and/or learned span data to the server 164 for the controller 180 to analyze the data. Based on the analysis of the turbocharger data (e.g., the first expected learned span, second expected learned span, and the regression analyses performed), the diagnostic tool 168 then provides instructions for repairing the service issue (step 256). In the illustrated embodiment, the instructions include installing a turbocharger wear kit.

As shown in FIG. 4, a repair process is much faster when the machine 104 includes the wireless transceiver 156 and/or a vehicle telematics system. The relevant analysis was performed by the automated planning system server 108 previous to a technician traveling to the machine 104. Furthermore, before traveling to the machine 104 the technician knew what the service issue was specifically and how to resolve it, so the technician could travel prepared to the machine 104. On the other hand, when the machine 104 does not include wireless transceiver 156, a technician waits for the analysis to be performed until the technician is near the machine 104. In some situations, the technician may not come prepared to install a turbocharger wear kit and the return to operation of the machine 104 may be delayed.

Figure 5A:
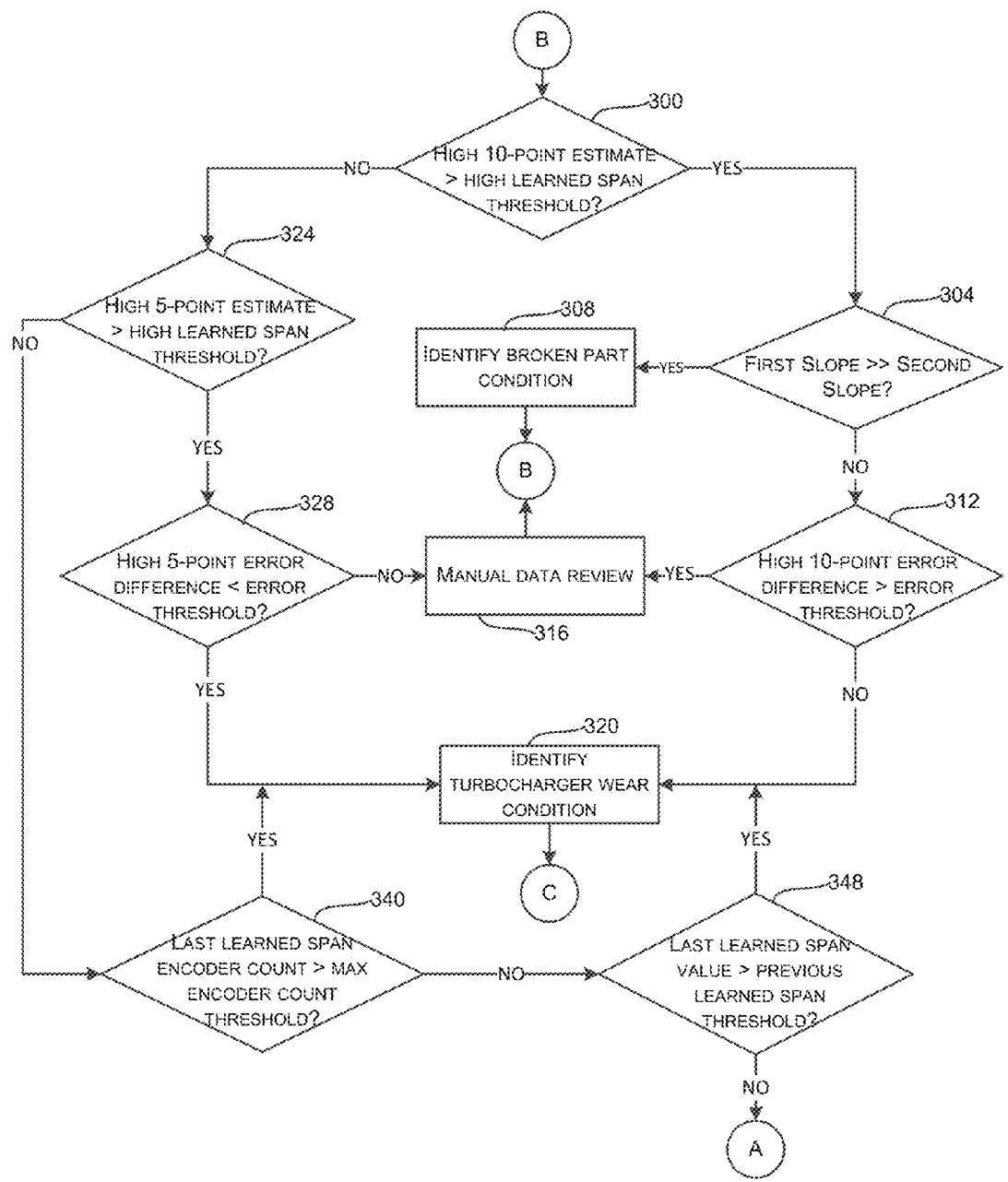
FIGS. 5A, 5B, and 5C are flowcharts of method for analysis of the turbocharger data.
Figure 5B:
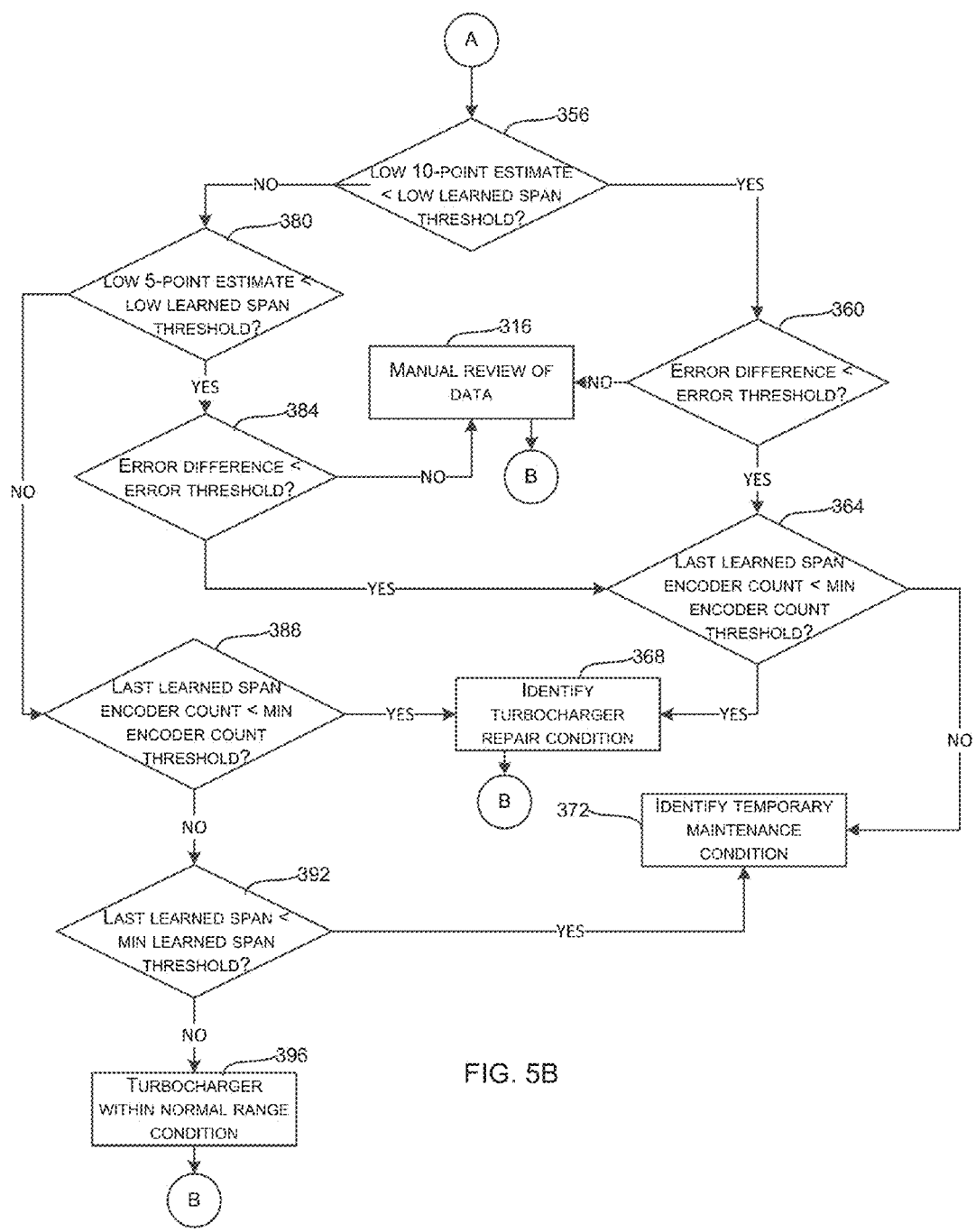
Figure 5C:
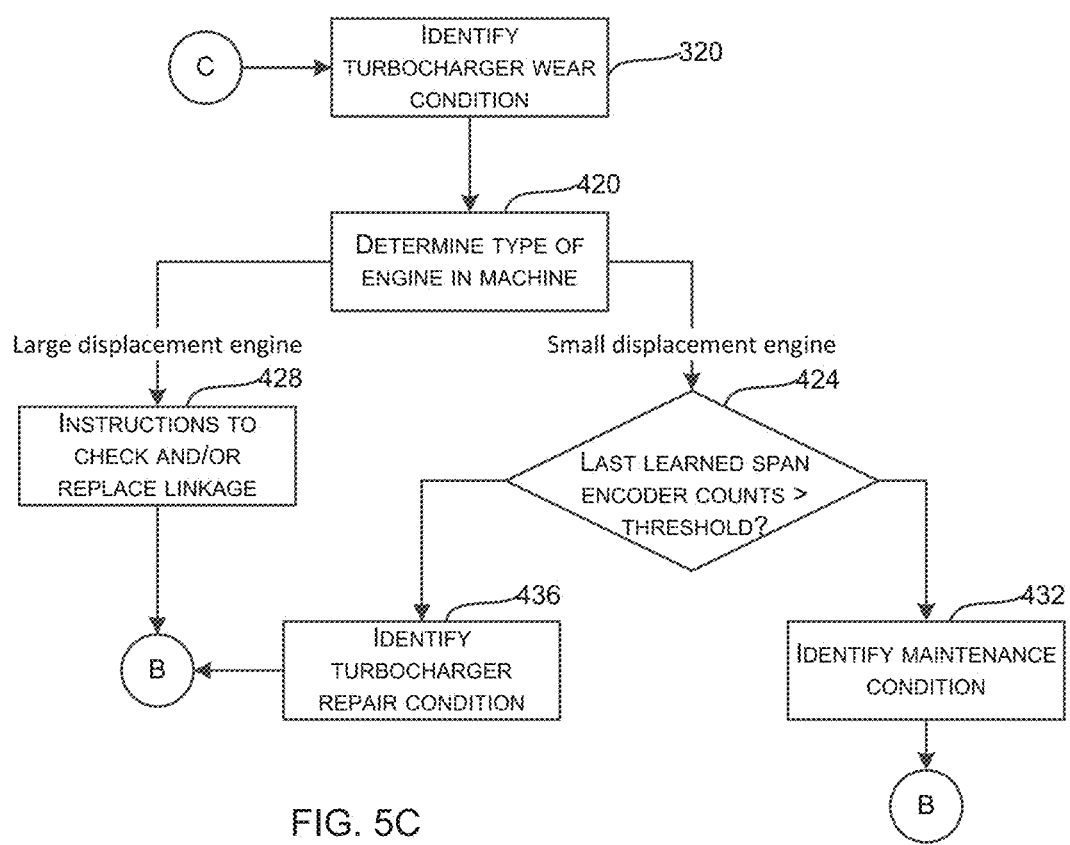

FIGS. 5A-C illustrate a detailed method of analyzing the first expected learned span value, the second expected learned span value, and information obtained from the first regression analysis and the second regression analysis to determine a condition of the machine 104, and in particular, to determine if the machine 104 knows about a condition related to the wear of the turbocharger. As shown in FIG. 5A, the high 10-point estimate is compared to a predetermined high learned span threshold (step 300). In the illustrated embodiment the high learned span threshold is 1.1. If the high 10-point estimate exceeds the high learned span threshold, the controller 180 determines whether a first slope of the first regression analysis is much greater than a second slope of the second regression analysis (step 304). If the slope of the first regression analysis is much greater than the slope of the second regression analysis, the controller 108 identifies a damaged part condition with the machine 104 (step 308). The damaged part condition refers to a part of the machine 104 not necessarily related to the turbocharger 116. For example, when this condition is identified, the automated planning system server 108 may instruct the user to replace a manifold, stud, bracket, or another part of the machine 104. The service and repair center 112 may then repair and/or replace the damaged part identified by the automated planning system server 108. Once the damaged part is repaired and/or replaced, the automated planning system server 108 returns to step 300 to continue monitoring the output from the vane position sensor 148. If, on the other hand, the slope of the first regression analysis is not much greater than the slope of the second regression analysis, the controller 180 proceeds to step 312.

Figure 6:
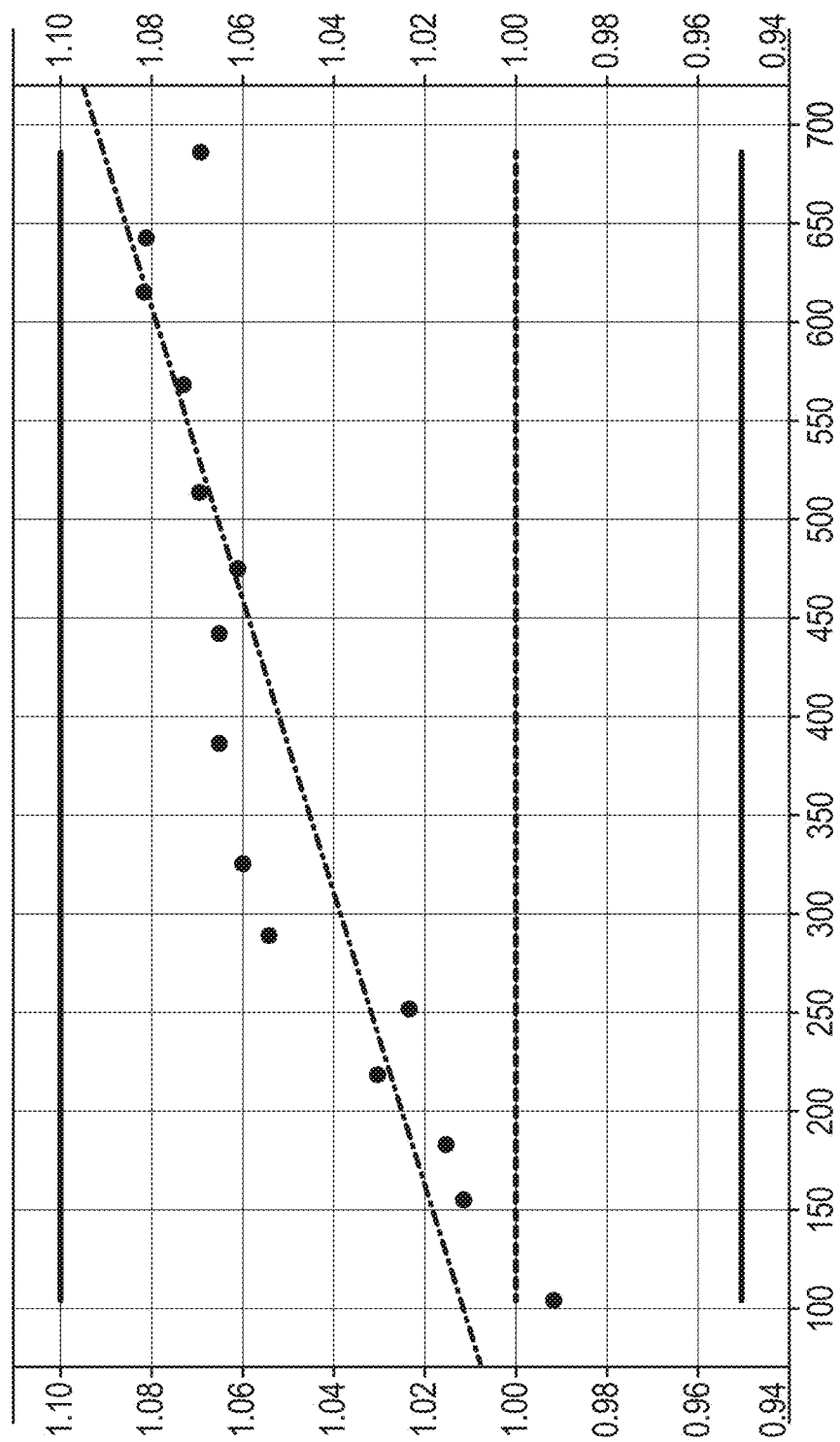
FIG. 6 is a graph of a set of learned span data points illustrating loping of the data points.

By comparing the first regression analysis and the second regression analysis (i.e., comparing the slopes corresponding to each analysis), the controller 180 can identify "loping" of the learned span values. FIG. 6 illustrates an example of loping learned span data values. The loping learned span data values form curved trajectories rather than straight lines. Therefore, the first regression analysis, because it utilizes a greater amount of data values (e.g., 10 points instead of 5 points) generally has a much greater slope than when the second regression analysis generates the slope associated with only the previous five measurements. In some embodiments, the controller 180 determines that the first slope is much greater than the second slope when a difference between the first slope and the second slope exceeds a predetermined threshold. The predetermined threshold can be specifically selected to identify "loping" of the learned span data values.

At step 312, the controller compares the high 10-point estimate with the first expected learned span value. If the difference between the high 10-point estimate and the first expected learned span value (e.g., the error difference) is greater than a predetermined error threshold, thereby indicating that the error margin is significantly high, the controller 180 instructs a user (e.g., an engineer) to perform manual data review (step 316). The user performing the manual data review may determine how to repair the machine 104, or which further diagnostics steps to take to repair the fault of the machine 104. During and after the manual review, however, the automated planning system server 108 continues to monitor the output from the vane position sensor 148 at step 300. If, however, the difference between the high 10-point estimate and the first expected learned span value is less than the predetermined error threshold, the controller 180 identifies a turbocharger wear condition with the machine 104 (step 320). The turbocharger wear condition indicates that maintenance or repair needs to be performed on the turbocharger 116 of the machine 104.

Referring back to step 300, if the high 10-point estimate does not exceed the high learned span threshold, the controller 180 proceeds to determining whether the high 5-point estimate exceeds the high learned span threshold (step 324). If the high 5-point estimate exceeds the high learned span threshold, the controller determines whether the difference between the high 5-point estimate and the second expected learned span value (e.g., the 5-point error difference) is less than the predetermined error threshold (step 328). If the 5-point error difference is less than the predetermined error threshold, the controller 180 identifies a turbocharger wear condition (step 320). If, however, the 5-point error difference is greater than or equal to the predetermined error threshold, the controller 180 instructs a user (e.g., an engineer) to perform a manual data review (step 316).

Figure 7:
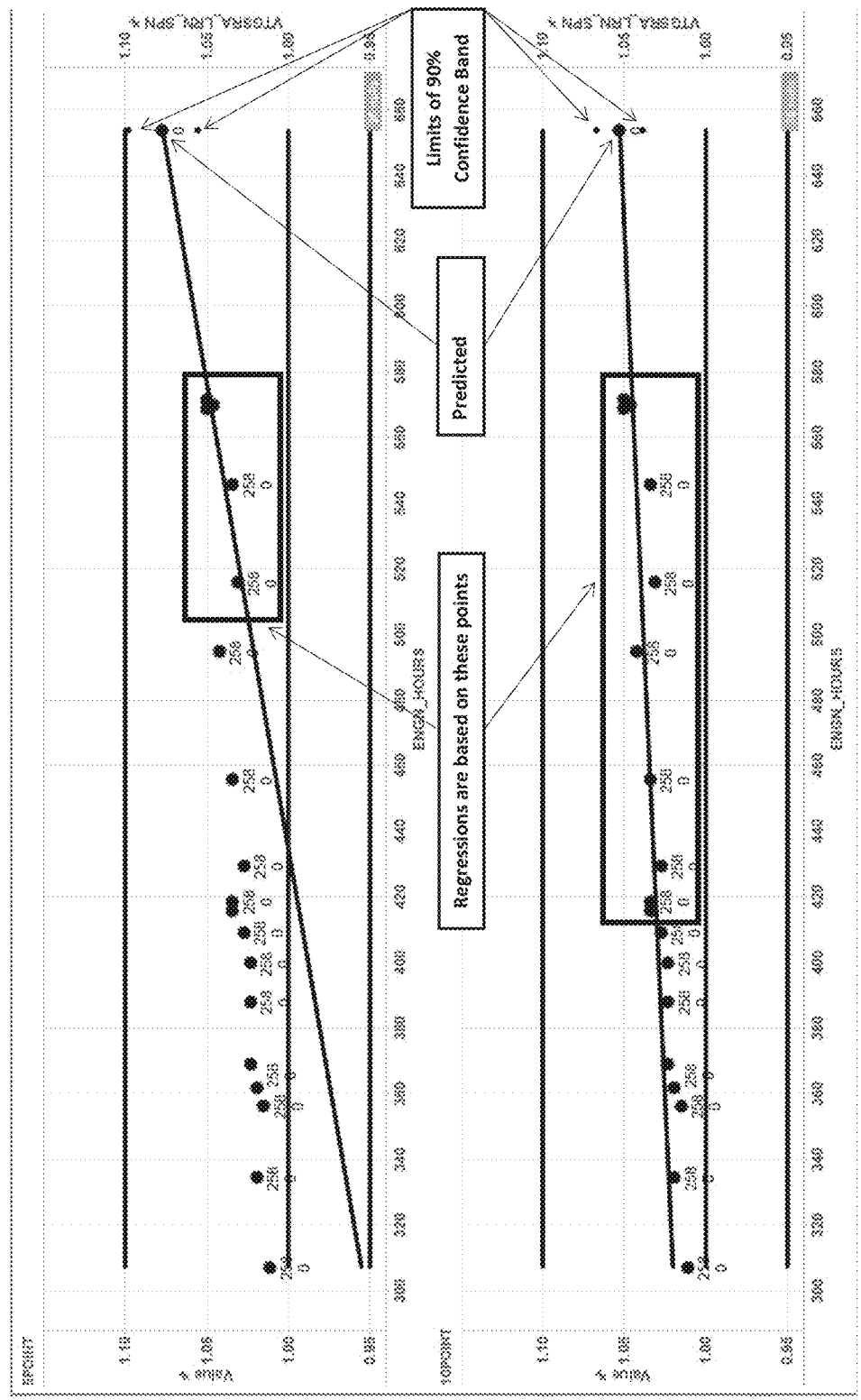
FIG. 7 is a set of graphs highlighting a change in operation condition for the machine.

FIG. 7 illustrates an example of learned span data points in which the first expected learned span value does not exceed the high learned span threshold, but the second expected learned span value does exceed the high learned span threshold. This difference in the first expected learned span value and the second expected learned span value is indicative of a change of slope between the first slope and the second slope, which may be due to a change in the operation of the machine 104. In some embodiments, the controller 180 identifies this condition by determining whether a difference between the first slope and the second slope is greater than a predetermined threshold. If the difference between the first slope and the second slope is greater than the predetermined threshold, the controller 180 may identify a change of operating condition of the machine 104.

Referring back to step 324, if the high 5-point estimate does not exceed the high learned span threshold, the controller 180 then determines whether the last learned span corresponds to an encoder count that exceeds a maximum encoder count threshold (step 340). If the encoder count of the last learned span value exceeds the maximum encoder count threshold, the controller 180 identifies a turbocharger wear condition (step 320). If, on the other hand, the encoder count for the last learned span does not exceed the maximum encoder count threshold, the controller 180 proceeds to step 348.

At step 348, the controller 180 determines whether the last learned span value is greater than a learned span threshold. If the last learned span value is greater than the learned span threshold, the controller 180 identifies the turbocharger wear condition for the machine 104 (step 320). If, on the other hand, the last learned span value is not greater than the learned span threshold, the controller 180 proceeds to step 356.

The controller 180 then analyzes a low threshold of the learned span values. At step 356, the controller 180 determines whether the low 10-point estimate is below the low learned span threshold. In the illustrated embodiment, the low learned span threshold is 0.95. If the low 10-point estimate is below the low learned span threshold, the controller 180 proceeds to determine the low error difference of the 10-point estimate. In particular, the controller 180 determines whether the difference between the low 10-point estimate and the first expected learned span value is less than the error threshold (step 360). If the difference between the low 10-point estimate and the first expected learned span value is less than the error threshold, the controller 180 determines whether the last learn encoder count is below a minimum encoder count threshold (step 364). If the last learned span corresponds to an encoder count of less than the minimum encoder count threshold, the controller 180 identifies a turbocharger repair condition with the machine 104 (step 368). The controller 180, in response, instructs a technician from, for example, the service and repair center 112 to replace the turbocharger assembly. After replacement of the turbocharger assembly is completed, the automated planning system server 108 continues to monitor the output from the vane position sensor 148 by returning to step 300. If, however, the last learned span does not correspond to an encoder count of less than the minimum encoder count threshold, the machine 104 may be associated with a temporary maintenance condition (step 372). The temporary maintenance condition can be resolved, for example, by reprogramming and/or recalibrating the vane position sensor 148.

Referring back to step 360, if the controller 180 determines that the difference between the low 10-point threshold is greater than the error threshold, the controller 180 then instructs a user (e.g. an engineer) to manually review the learned span data (step 316). Referring back to step 356, if the low 10-point estimate is not below the low learned data threshold, the controller 180 continues to determine whether the low 5-point estimate is below the low learned span threshold (step 380). If the controller 180 determines that the low 5-point estimate is below the low learned span threshold the controller 180 determines whether the error associated with the low 5-point estimate is within an acceptable level (step 384). In particular, the controller 180 calculates a difference between the low 5-point estimate and the second expected learned span value, and determines whether the difference is below the error threshold (step 384). If the difference is less than the error threshold, the controller 180 proceeds to check whether the least learned span corresponds to an encoder count of less than the minimum encoder count threshold (step 364). If, on the other hand, the difference is greater than the error threshold, the controller 180 instruct the user (e.g., engineer) to manually review the data collected (step 316).

Referring back to step 380, if the controller 180 determines that the low 5-point estimate is not less than the minimum learned span threshold, the controller 180 then proceeds to step 388 and determines whether the last learned span corresponds to an encoder count of less than the minimum encoder count threshold. The controller then determines that the machine 104 includes a turbocharger repair condition (step 368) when the last learned span corresponds to an encoder count that does not exceed (i.e., is below) the minimum encoder count threshold. If, however, the last learned span is not associated with an encoder count below the minimum encoder count threshold, the controller 180 also determines whether the last learned span is below the minimum learned span threshold (step 392). If the last learned span is below the minimum learned span threshold, the controller 180 identifies a temporary turbocharger condition (step 372). If, however, the last learned span is not below the minimum learned span threshold, the controller 180 determines that the machine 104 is in a normal threshold condition (step 396). The automated planning system server 108 continues to monitor the output from the vane position sensor 148 (at step 300) to inhibit complete failure of the turbocharger assembly.

As shown in FIG. 5C, when a turbocharger wear condition was identified (steps 320), the controller 180 determines what type of engine is associated with the machine (step 420). If the engine associated with the machine is a small displacement engine (e.g., 4.5 or 6.8 L), the controller 180 then determines the encoder counts associated with the last learned span data (step 424). If the engine associated with the machine 104 is a large displacement engine (e.g., 13.5 L), the controller 180 instructs the user (e.g., a technician) to check and/or replace the turbocharger actuator linkage 119 (step 428). After linkage 119 has been replaced, the automated planning system server 108 returns to step 300 to continue monitoring the conditions associated with the turbocharger 116. Referring to step 424, if the last learned span data is associated with an encoder count of less than (i.e., not greater than, or greater than or equal to) the maximum encoder count threshold (e.g., 300 encoder counts), a maintenance turbocharger condition is identified for the machine 104 (step 432). When the maintenance turbocharger condition is identified, a turbocharger wear kit is installed to slow and/or inhibit further turbocharger wear. Once the turbocharger wear kit is installed, the automated planning system server 108 returns to step 300 to continue monitoring the conditions associated with the turbocharger 116. If, however, the last learned span data is associated with an encoder count of more than the maximum encoder count threshold, a turbocharger repair condition is identified with the machine 104 (step 436). Again, after replacement of the turbocharger is complete, the automated planning system server 108 returns to step 300 to monitor the conditions associated with the turbocharger 116.

When the manual data review is necessary or recommended because the error associated with the expected learned span values is too high, the engineer, or the automated planning system server 108 may contact the service and repair center 112 and then a technician determines, upon manually checking the turbocharger whether replacement is needed. Additionally, although the controller 180 has been described as executing most of the steps of the flowcharts of FIGS. 5A-C, in some embodiments, the electronic control module 144 performs the analysis of the turbocharger data. In yet other embodiments, a processing unit of the diagnostic tools 168 performs the analysis of the turbocharger data.

Figure 8:
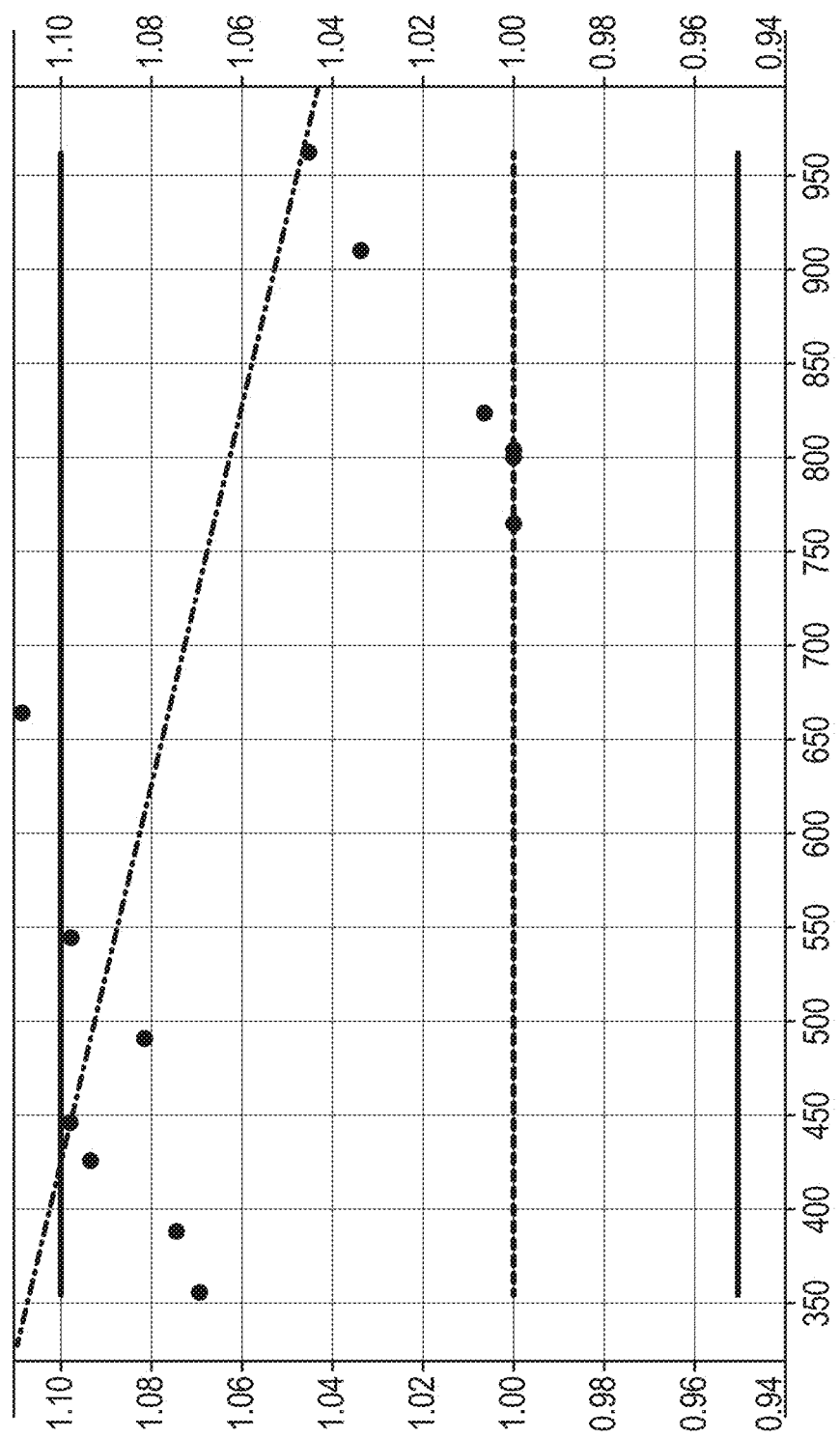
FIG. 8 is a graph illustrating a discontinuity in the learned span values associated with this machine.

In the illustrated embodiment, the controller 180 is also configured to determine other conditions associated with the machine 104. For example, the controller 180 compares the slope associated with the first regression analysis and the slope associated with the second regression analysis to determine if a turbocharger replacement and/or a turbocharger wear kit has been installed. In such an embodiment, the controller 180 identifies a turbocharger maintenance condition when the slope associated with the first regression analysis is of a different sign than the slope associated with the second regression analysis as shown in FIG. 8. The change in sign of the slopes associated with the first and second regression analysis indicates a discontinuity in the learned span data as shown in FIG. 8. In particular, this discontinuity is created when the learned span values of the machine exceeded or were close to exceeding the maximum learned span threshold, and in response to such a condition, a turbocharger was replaced and/or a turbocharger wear kit was installed.

In other embodiments, installation of a new turbocharger and/or turbocharger wear kit is detected by a change in the reference vane position sensor value and/or a decrease in the operating hours of the turbocharger, for example, as received by the controller 180. When the installation of a new turbocharger or of a turbocharger wear kit is detected, the controller 180 analyzes the turbocharger data only after the new reference vane position sensor values have been received and/or the decrease in operating hours is detected, and disregards the turbocharger data previous to the new reference vane position sensor values and/or the decrease in the operating hours for the turbocharger 116. In the illustrated embodiment of FIG. 8, the controller 180 would disregard the first 7 learned span values.

Vibration characteristics can also change and affect turbocharger wear significantly. Therefore, in some embodiments, based on where the machine is operated on the torque curve, load profile information such as time at percentage of load and time at engine speed could be incorporated into the logic to enhance the system. Additionally, although the controller 180 of the automated planning system server 108 has been described as carrying out the method of analyzing the turbocharger data, in other embodiments, the analysis is performed at the machine 104 and the service and repair center 112 receives an indication of the service issue. In other embodiments, running of the first regression analysis and the second regression analysis allows analysis of many different types of data, not just turbocharger type data.

Thus, the invention provides, among other things, a method to determine when a turbocharger condition may occur. Various features and advantages of the invention are set forth in the following claims.

What is claimed is:

1. A diagnostic system for a machine with a combustion engine and a variable geometry turbocharger, the variable geometry turbocharger including a vane position sensor, the diagnostic system comprising:
a controller configured to
monitor an output from the vane position sensor indicative of a position of the vane of the turbocharger during a diagnostic procedure,
calculate a learned span value of the turbocharger based on the output of the vane position sensor during the diagnostic procedure and a reference vane position sensor value,
access a plurality of stored learned span values, each calculated during a different one of a plurality of diagnostic procedures performed over a period of time,
perform a first regression analysis to predict an expected learned span value at a defined future time using the calculated learned span value and the plurality of stored learned span values, and
generate an alert message when the expected learned span value is indicative of a potential future fault of the turbocharger.

2. The diagnostic system of claim 1, wherein the defined future time of the expected learned span value is approximately 50 hours after a most recent diagnostic procedure.

3. The diagnostic system of claim 1, wherein the reference vane position sensor value corresponds to a sensor value from a calibration, and wherein the learned span value corresponds to a ratio of the output of the vane position sensor during the diagnostic procedure to the reference van position sensor value.

4. The diagnostic system of claim 1, wherein the controller is configured to determine the expected learned span value is indicative of a potential future fault of the turbocharger when the expected learned span value is outside of an operating learned span range.

5. The diagnostic system of claim 1, wherein the controller is configured to access a second plurality of stored learned span values, the second plurality of stored learned span values being a sub-set of the first plurality of stored learned span values, and perform a second regression analysis to predict a second expected learned span value at the defined future time using the calculated learned span value and the sub-set of the plurality of stored learned span values.

6. The diagnostic system of claim 5, wherein the controller is configured to identify a condition of the machine based on a comparison of the first expected learned span value and the second expected learned span value, a comparison of the first regression analysis and the second regression analysis, or both.

7. The diagnostic system of claim 6, wherein the controller is configured to identify a change of operating condition of the machine when a difference between a first rate of change associated with the first regression analysis and a second rate of change associated with the second regression analysis exceeds a predetermined threshold.

8. The diagnostic system of claim 6, wherein the controller is configured to identify a turbocharger maintenance condition when the comparison of the first regression analysis and the second regression analysis indicates a discontinuity in the plurality of stored learned span values.

9. The diagnostic system of claim 6, wherein the controller is configured to identify a turbocharger maintenance condition when a first slope associated with the first regression analysis has a different sign than a second slope associated with the second regression analysis.

10. The diagnostic system of claim 6, wherein the controller is configured to identify a damaged part condition when a comparison between a first slope associated with the first regression analysis and a second slope associated with the second regression analysis exceeds a predetermined threshold, and wherein the second slope is greater than the first slope.

11. The diagnostic system of claim 6, wherein the second plurality of learned span values includes more recent learned span values than the first plurality of learned span values.

12. The diagnostic system of claim 1, wherein the controller is positioned within the machine, and wherein the controller is configured to access the plurality of stored learned span values by accessing a non-transitory computer-readable memory positioned within the machine.

13. The diagnostic system of claim 1, wherein the controller is at a location that is remote from a location of the machine, and wherein the machine includes a communication transceiver configured to transmit the output from the vane position sensor indicative of a position of the vane of the turbocharger at the time of the diagnostic procedure, and the plurality of stored learned span values to the controller.

14. The diagnostic system of claim 1, wherein the alert message includes instructing a technician to schedule a service call for the machine.

15. The diagnostic system of claim 1, wherein the machine also includes an electronic control module, and the diagnostic system further comprising a connector configured to connect the diagnostic system to the electronic control module of the machine.

16. A method of diagnosing a machine with a combustion engine, and a variable geometry turbocharger, the variable geometry turbocharger including a vane position sensor, the method comprising:
monitoring an output from the vane position sensor indicative of a position of a vane of the turbocharger during a diagnostic procedure;
calculating a learned span value of the turbocharger based on the output of the vane position sensor during the diagnostic procedure and a reference vane position sensor value;
accessing a plurality of stored learned span values, each calculated during a different one of a plurality of diagnostic procedures performed over a period of time;
performing a first regression analysis to predict an expected learned span value at a defined future time using the calculated learned span value and the plurality of stored learned span values;
generating an alert message when the expected learned span value is indicative of a potential future fault of the turbocharger.

17. The method of claim 16, further comprising
accessing a second plurality of stored learned span values, the second plurality of stored learned span values being a sub-set of the first plurality of learned span values;

performing a second regression analysis to predict a second expected learned span value at the defined future time using the calculated learned span value and the second plurality of stored learned span values;

identifying a condition of the machine based on a comparison of the first expected learned span value and the second expected learned span value, a comparison of the first regression analysis and the second regression analysis, or both.

18. The method of claim 16, further comprising determining that an expected learned span value is indicative of a potential future fault of the turbocharger when the expected learned span value operates outside an operating learned span range.

19. The method of claim 17, wherein identifying the condition includes identifying a change of operating condition of the machine when a difference between a first slope associated with the first regression analysis and a second slope associated with the second regression analysis exceeds a predetermined threshold.

20. The method of claim 17, wherein identifying the condition includes identifying a turbocharger maintenance condition when the comparison between a first slope associated with the first regression analysis and a second slope associated with the second regression analysis exceeds a predetermined threshold, and wherein the second slope is greater than the first slope.

21. The method of claim 16, further comprising calculating an error range corresponding to the expected learned span value.

* * * * *